(12) United States Patent
Keller, Jr. et al.

(10) Patent No.: US 6,772,199 B1
(45) Date of Patent: Aug. 3, 2004

(54) METHOD AND SYSTEM FOR ENHANCED CACHE EFFICIENCY UTILIZING SELECTIVE REPLACEMENT EXEMPTION

(75) Inventors: Thomas Walter Keller, Jr., Austin, TX (US); Karthikeyan P. Sankaralingam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 09/661,661

(22) Filed: Sep. 14, 2000

(51) Int. Cl.$^7$ .............................................. G06F 15/167
(52) U.S. Cl. ..................... 709/213; 709/214; 709/215; 709/217; 709/218; 709/219; 711/133
(58) Field of Search ................................ 709/213, 214, 709/215, 217, 218, 219; 711/133

(56) References Cited

U.S. PATENT DOCUMENTS

| | | | | |
|---|---|---|---|---|
| 5,924,116 A | * | 7/1999 | Aggarwal et al. | 711/122 |
| 6,012,126 A | * | 1/2000 | Aggarwal et al. | 711/133 |
| 6,272,598 B1 | * | 8/2001 | Arlitt et al. | 711/133 |
| 6,338,117 B1 | * | 1/2002 | Challenger et al. | 711/122 |
| 6,351,767 B1 | * | 2/2002 | Batchelder et al. | 709/219 |
| 6,370,620 B1 | * | 4/2002 | Wu et al. | 711/132 |
| 6,415,368 B1 | * | 7/2002 | Glance et al. | 711/158 |
| 6,425,057 B1 | * | 7/2002 | Cherkasova et al. | 711/134 |
| 6,516,384 B1 | * | 2/2003 | Clark et al. | 711/109 |
| 6,542,964 B1 | * | 4/2003 | Scharber | 711/122 |
| 6,601,143 B1 | * | 7/2003 | Lamparter | 711/134 |
| 2002/0026563 A1 | * | 2/2002 | Chamberlain et al. | 711/138 |
| 2002/0078300 A1 | * | 6/2002 | Dharap | 711/133 |

* cited by examiner

*Primary Examiner*—Nabil El-Hady
(74) *Attorney, Agent, or Firm*—Casimer K. Salys; Dillon & Yudell LLP

(57) ABSTRACT

A method and system for enhanced cache efficiency is a cache associated with a server in a wide area network having multiple servers and clients. Objects retrieved from the network by a server are stored within a cache associated with the server and selected objects are designated as temporarily exempt from replacement based upon a preselected criterion, such as size or mandated quality of service for the client which requested the object. After the cache is full or nearly full, subsequently retrieved objects are stored by casting out one or more objects which are not exempt from replacement according to a specified replacement algorithm, such as Least Recently Utilized, or by casting out any object or objects, if all objects in the cache are designated as exempt from replacement.

15 Claims, 4 Drawing Sheets

METHOD AND SYSTEM FOR ENHANCED CACHE EFFICIENCY UTILIZING SELECTIVE REPLACEMENT EXEMPTION

BACKGROUND OF THE INVENTION

1. Technical Field

The present invention relates in general to an enhanced cache replacement scheme and in particular to an enhanced cache replacement scheme for utilization in a network server. Still more particularly the present invention relates to a cache replacement scheme which temporarily exempts selected objects from replacement within the cache based upon some preselected criterion.

2. Description of the Related Art

The information content of the world we live in is growing at a geometric rate. The total amount of documents and knowledge available to the average citizen of the United States utilizing a computer is truly enormous. Documents, data and other information may be distributed over a large geographic area in a so-called wide area network. The most common of these wide area networks is the so-called World Wide Web. The World Wide Web is the total set of inter link hypertext documents which reside on HTTP servers all around the world. An HTTP server is a server software system which utilizes the Hypertext Transfer Protocol to serve up HTML (Hypertext Markup Language) documents and any associated files and scripts when requested by a client, typically using a so-called web browser. The connection between the client and server is usually broken after the requested document or file has been served.

Documents on the World Wide Web called pages or web pages are identified by a Uniform Resource Locator (URL) which specifies the particular machine and path name by which a file can be accessed, and transmitted from node to node to the end user under HTTP. Codes, called tags, embedded in HTML document associate particular words or images in the document with other URLs so that a user can access another file, which may be half way around the world, at the press of a key or the click of a mouse. These files or objects may contain text (in a variety of fonts and styles), graphics images, moving files, and sounds as well as Java applets, ActiveX controls, or other small embedded software programs that execute when the user activates them by clicking on a link. Java is an object-oriented programing language developed by Sun Microsystems, Inc. ActiveX is a set of technologies which enable software components to interact with one another in a network environment, regardless of the language in which the components were created. ActiveX, which was developed as a proposed standard by Microsoft in the mid 1990s, is currently administered by the Open Group and is built upon Microsoft's Component Object Model.

Thus, a user visiting a web page may be able to download files from a site and send messages to other users via e-mail by utilizing links on the web page.

In order to enhance the efficiency with which web page or other objects may be retrieved from the World Wide Web servers within this network typically employ a cache memory. A cache is a special memory subsystem in which frequently utilized data values are duplicated for quick access. A cache memory stores the content of frequently accessed locations and the addresses where those data items are stored. Thereafter, when a server references an address within the World Wide Web, the cache can check to determine whether or not the web page at that address is within the cache. If the cache does contain the web page at that address, the web page or other object is then returned to the server. If not, access through regular web channels occurs.

The cache memory associated with a network or web server is typically at least 200 megabytes in size; however, those skilled in this art will appreciate that complex web pages or other objects may contain a significant amount of data and thus, it is important that an efficient replacement scheme be utilized to determine which objects should be maintained within the cache memory associated with a network server at any given time.

Well known and conventional cache replacement algorithms are known to those having skill in this art. For example, one technique for determining which object within a cache to replace is the so-called "Least Recently Utilized" (LRU) algorithm whereby the object within the cache memory which has least recently been utilized is the object selected for replacement when a new object or web page must be stored within the cache. Cache developers are continually attempting to refine these algorithms to increase the efficient utilization of cache memory.

It should therefore be apparent that a need exists for a method and system for enhancing the efficiency of the utilization of cache memory.

SUMMARY OF THE INVENTION

It is therefore one object of the present invention to provide an enhanced cache replacement scheme.

It is another object of the present invention to provide an enhanced cache replacement scheme for utilization in a network server.

It is yet another object of the present invention to provide an enhanced cache replacement scheme which temporarily exempts selected objects from replacement within the cache based upon determined criterion.

The foregoing objects are achieved as is now described. A method and system are disclosed for an enhanced cache replacement efficiency in a cache which is associated with a server in a wide area network having a multiple servers and clients. Objects or web pages retrieved from the network by a server are stored within a cache associated with the server and selected objects are designated as temporarily exempt from replacement based upon a preselected criterion, such as the size of the object or a mandated quality of service (QOS) for the particular client which requested the object. After the cache is full or nearly full, subsequently retrieved objects are stored by casting out one or more objects which are not exempt from replacement according to a specified replacement algorithm, such as "Least Recently Utilized," or by casting out any object or objects according to a specified replacement algorithm, if all objects in the cache are designated as exempt from replacement.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
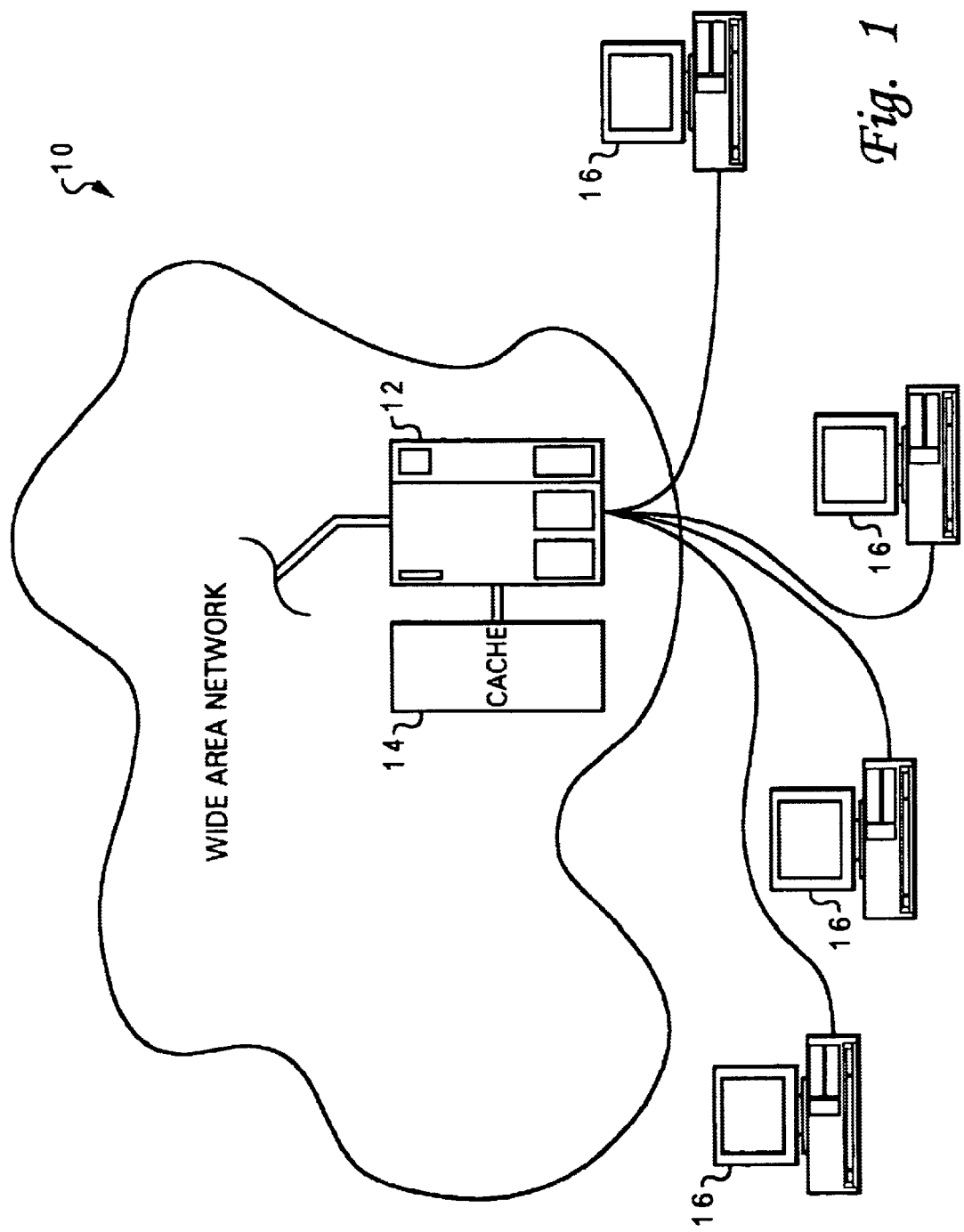
FIG. 1 is a partially pictorial schematic representation of a wide area network which can utilize the method and system of the present invention.

With reference now to the figures in particular with reference to FIG. 1, there is depicted a partially pictorial schematic representation of a wide area network which can utilize the method and system of the present invention. As illustrated, wide area network 10, which may constitute the World Wide Web, includes a network server 12, which may constitute a web server. Of course, those skilled in the art will appreciate that network server 12 comprises but a single network server from among many network servers which are typically contained within a wide area network such as wide area network 10.

Associated with network server 12 is cache memory 14. As described above, cache memory 14 typically comprises a rapid access random access memory capable of containing approximately 200 megabytes of data. Also depicted within FIG. 1 are multiple clients 16 which are coupled to network server 12 in a manner conventional to those having ordinary skill in this art.

Figure 2:
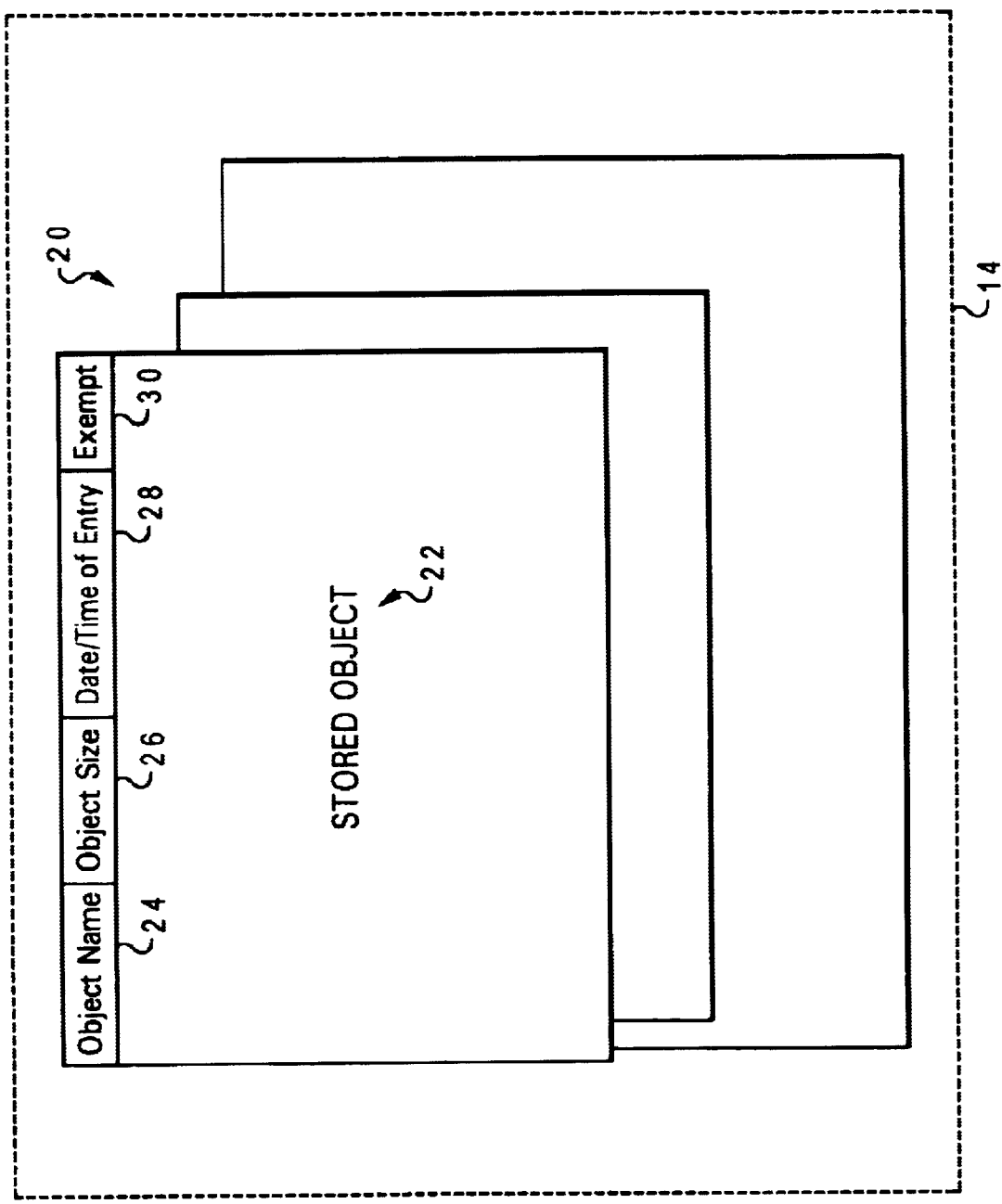
FIG. 2 is schematic representation of multiple objects stored within a cache memory in accordance with the method and system of the present invention.

Referring now to FIG. 2, there is a depicted schematic representation of multiple different sized objects 20 which are stored within cache memory 14 in accordance with the method and system of the present invention. As schematically illustrated, each stored object 20 includes a large storage area for the stored object or web page 22. Associated with each stored object 20 are a plurality of control fields. For example, in the embodiment depicted within FIG. 2, the first control field is the object name field 24.

In object name field 24 is stored the particular name and the address or URL of the retrieved object or web page. Next, object size field 26 is depicted. Object size field 26 specifies the size of the stored object 22.

Next, in accordance with an important feature of the present invention, the date and time of entry of stored object 22 into cache 14 is memorialized within date/time of entry field 28. As will be explained in greater detail herein, the date and time of entry by an object into the cache memory may be utilized to alter the status of that object in accordance with the method and system of the present invention. Finally, exempt field 30 is utilized to indicate whether or not a particular stored object 22 is temporarily exempt from replacement within cache memory 14. In a manner which will be illustrated in greater detail below, particular objects may be temporarily designated as exempt from replacement in order to enhance the efficient utilization of cache memory 14.

Figure 3:
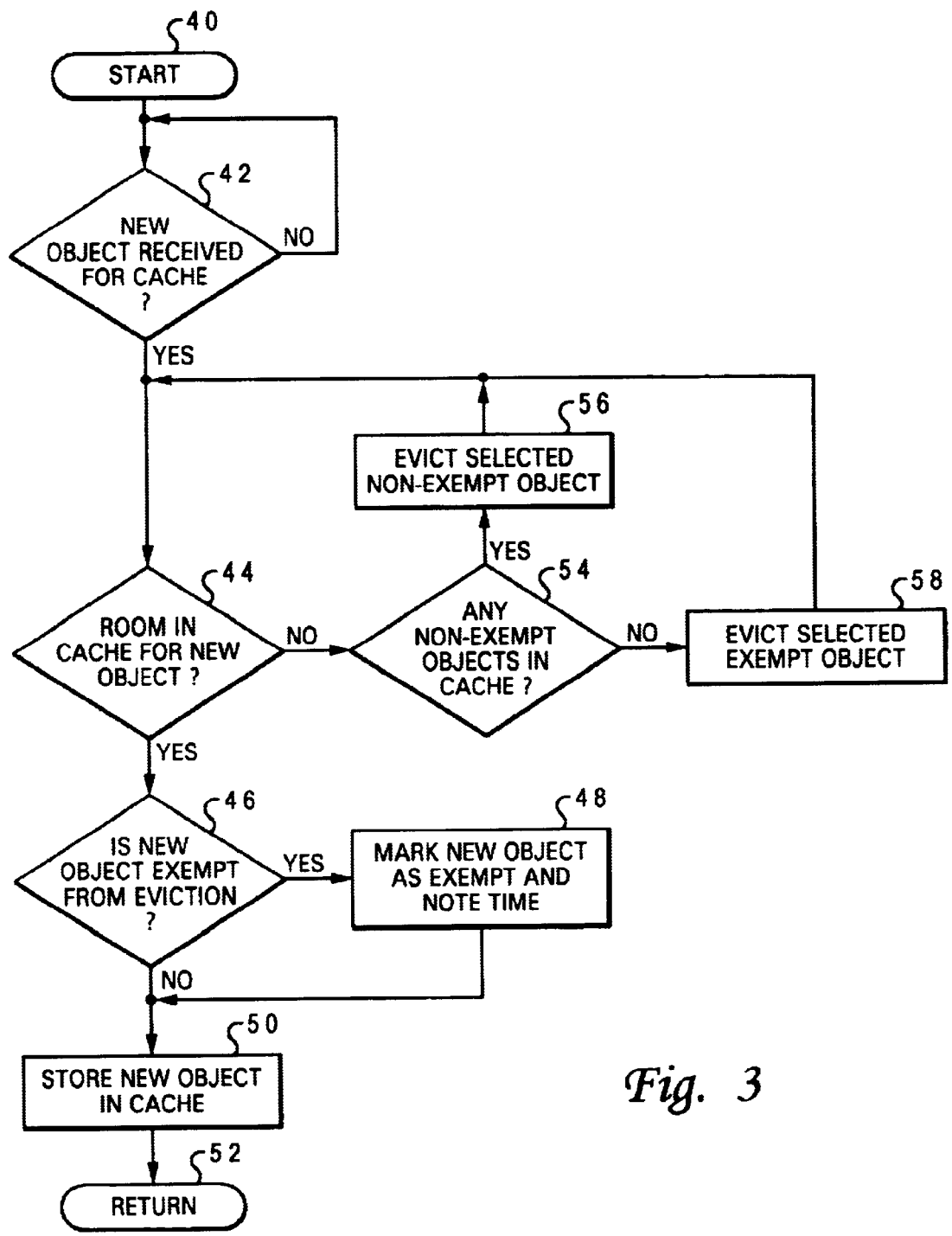
FIG. 3 is a high level logic flowchart illustrating a method for storing objects in a cache memory in accordance with the method and system of the present invention.

With reference now to FIG. 3, there is depicted a high level logic flowchart which illustrates a method for storing objects in a cache memory in accordance with the method and system of the present invention. As illustrated, this process begins at block 40 and thereafter passes to block 42. Block 42 illustrates a determination of whether or not a new object or web page has been received for storage within the cache memory. If not, this process merely iterates until such time as a new object is received for storage within the cache memory.

Still referring to block 42, in the event that a new object has been received for storage within the cache memory, the process passes to block 44. Block 44 illustrates a determination of whether or not there is room within the cache for the new object. If there is room within the cache for the new object, the process passes to block 46.

Block 46 illustrates a determination of whether or not the new object is exempt from eviction. In accordance with an important feature of the present invention, selected objects or web pages may be designated as exempt from eviction from the cache memory. If this new object is to be temporarily exempt from eviction, the process passes to block 48. Block 48 illustrates the marking of the new object as exempt and the time of storage is noted.

In accordance with an important feature of the present invention, selected web pages or objects within the cache memory may be designated as temporarily exempt from eviction based upon selected criterion. For example, it has been determined by the inventor that smaller web pages or objects are more frequently accessed by a user. Thus, in accordance with one embodiment of the present invention, any object or web page which is less than 100 kilobytes in size can be automatically marked as temporarily exempt from eviction from the cache memory and stored within the cache memory. Another embodiment of the present invention may utilize the temporary exemption of a new object from eviction from the cache memory as a technique for ensuring the required quality of service (QOS) mandated for a particular client. Thus, web pages or other objects requested by a client having a high mandated quality of service (QOS) may have all such objects or web pages designated as temporarily exempt from eviction from the cache memory. The time each new object is stored is noted as, in accordance with the method and system of the present invention, the exemption from eviction is temporary in nature and will expire upon the lapse of a designated time period, such as ten minutes, two hours or one week.

Next, after the object has been marked as temporarily exempt from eviction and the time of storage noted, the process passes to block 50. Block 50 illustrates the storing of the new object or web page within the cache and the process then passes to block 52 and returns.

Returning to block 44, in the event the cache is full and/or insufficient room exists within the cache for the storage of a newly retrieved object or web page, the process passes to block 54. Block 54 illustrates a determination of whether or not any non-exempt objects are stored within the cache memory and if so, the process passes to block 56.

Block 56 illustrates the eviction of a selected non-exempt object from the cache memory utilizing any conventional cache replacement algorithm, such as Least Recently Utilized (LRU). Next, the process returns to block 44, in an iterative fashion, to determine whether or not the eviction of a selected non-exempt object has created sufficient room within the cache for the new object. If not, the process passes from block 44 to block 54, in an iterative fashion. In the event the eviction of a selected non-exempt object from the cache has created sufficient room within the cache for a new object, then the process passes from block 44 to block 46, as described above.

Finally, in the event no non-exempt objects are presently stored within the cache memory, as determined at block 54, the process passes to block 58. Block 58 illustrates the eviction of a selected exempt object from all of the exempt objects within the cache memory, utilizing a conventional cache replacement algorithm such as that described above. Thereafter, the process returns to block 44, in an iterative fashion, to determine whether or not the eviction of a selected exempt object from the cache has created sufficient room in the cache for a new object. If not, the process returns to block 54 for further determination of an eviction candidate as described above. Next, if sufficient room exists within the cache for the new object after evicting a selected exempt object, the process passes from block 44 to block 46 where the new object is classified as exempt or non-exempt and stored within the cache, as described above.

Figure 4:
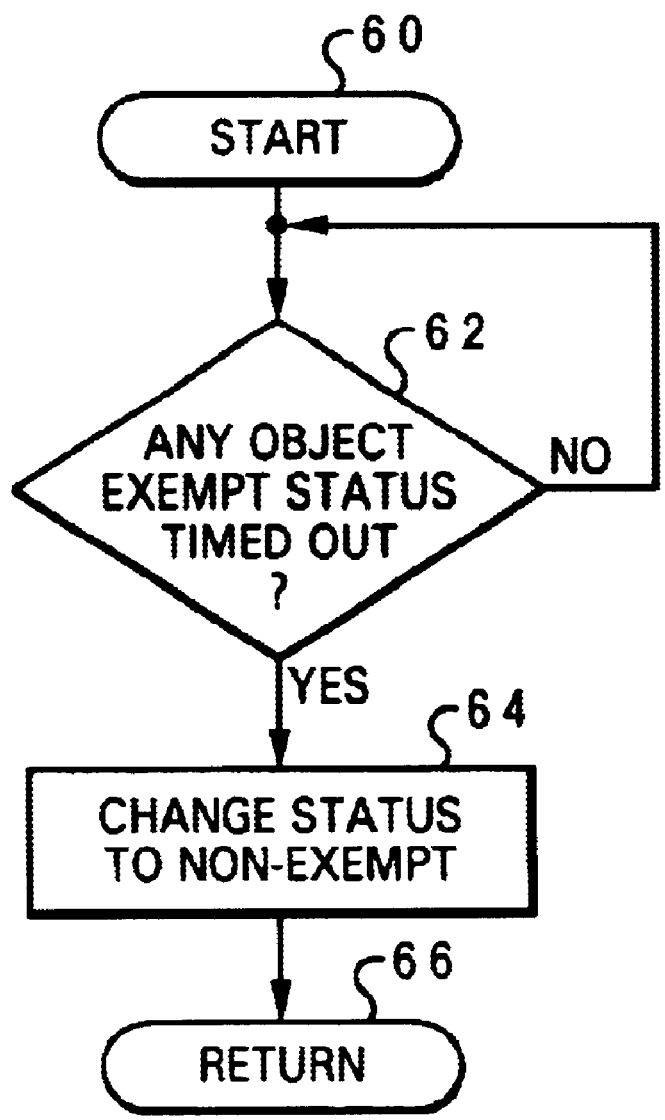
FIG. 4 is a high level logic flowchart illustrating a process for exemption management within a cache memory in accordance with the method and system of the present invention.

Finally, referring to FIG. 4, there is illustrated a high level logic flowchart which depicts a process for exemption management within a cache memory in accordance with the method and system of the present invention. As depicted, this process begins at block 60 and thereafter passes to block 62. Block 62 illustrates a determination of whether or not any object or web page has had its exempt status time out. That is, a lapse has occurred of the period of time for which the exempt status is valid. If not, this process iterates until such time as an exempt object has had its exempt status time out.

Still referring to block 62, in the event the exempt status of an object or web page has timed out, the process passes to block 64. Block 64 illustrates the changing of the status of that object or web page to non-exempt and the process then passes to block 66 and returns.

Upon reference to the foregoing of those skilled in the art will appreciate that the inventors herein have provided a method and system whereby selected objects or web pages stored within a network server cache may be granted exemption status based upon the likelihood that those objects or web pages will be repeatedly recalled or are required by a client having a high mandated quality of service (QOS).

While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as hard disk, RAM, etc., or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

What is claimed is:

1. A method for enhanced cache efficiency in a web server cache which is associated with a web server within a network which includes a plurality of web servers and clients, said method comprising the steps of:

storing selected web pages requested by clients attached to a selected web server within a web server cache associated with said selected web server;

specifying selected stored web pages within said web server cache as temporarily exempt from replacement based upon a preselected criterion;

casting out a web page within said web server cache which is not designated as temporarily exempt from replacement according to a specified cache replacement algorithm in response to a subsequent attempt to store a web page within said web server cache if insufficient space exists within said web server cache; and casting out any web page within said web server cache according to said specified cache replacement algorithm in response to a subsequent attempt to store a web page within said web server cache if insufficient space exists within said web server cache and all stored web pages therein are temporarily exempt from replacement.

2. The method for enhanced cache efficiency according to claim 1, wherein said step of specifying selected stored web pages within said web server cache as temporarily exempt from replacement based upon a preselected criterion comprises the steps of specifying selected stored web pages within said web server cache as temporarily exempt from replacement based upon a size of each of said selected web pages.

3. The method for enhanced cache efficiency according to claim 2, wherein the step for specifying selected stored web pages with said web server cache as temporarily exempt from replacement based upon a size of each of said selected web pages comprises the step of specifying any web page which is less than 100 kilobytes in size as temporarily exempt from replacement.

4. The method for enhanced cache efficiency according to claim 1, wherein said step of specifying selected stored web pages within said web server cache as temporarily exempt from replacement based upon a preselected criterion comprises the step of specifying selected stored web pages within said web server cache as temporarily exempt from replacement based upon a quality of service level mandated for a client which requested said selected web pages.

5. A network system comprising:

a processor coupled to a network;

a cache memory associated with said processor for temporarily storing objects retrieved said network; and cache control means for specifying selected objects within said cache as temporarily exempt from replacement based upon a preselected criterion, for casting out an object which is not designated as temporarily exempt from replacement according to a specified cache replacement algorithm in response to a subsequent attempt to store an object within said cache if insufficient space exists within said cache and for casting out any object within said cache according to said specified cache replacement algorithm in response to a subsequent attempt to store an object in said cache if insufficient space exists within said cache and all stored objects therein are temporarily exempt from replacement.

6. The network system according to claim 5, wherein said cache control means specifies selected objects as temporarily exempt from replacement within said cache based upon a size of each object.

7. The network system according to claim 6, wherein said cache control means specifies selected object as temporarily exempt from replacement within said cache if said selected objects are less than 100 kilobytes in size.

8. The network system according to claim 5, wherein said cache control means specifies selected objects as temporarily exempt from replacement within said cache based upon a specified quality of service mandated for a client which requested said selected objects.

9. The network system according to claim 5, wherein said cache memory comprises a random access memory.

10. The network system according to claim 5, wherein said network system further includes a plurality of clients coupled to said processor.

11. A method for enhanced cache efficiency in a server cache which is associated with a server within a network which includes a plurality of service and client, said method comprising the steps of:

storing selected objects requested by clients attached to a selected server within a server cache as attached to said selected server;

specifying selected stored objects within said server cache as temporarily exempt from replacement based upon a preselected criterion;

casting out an object with said server cache which is not designated as temporarily exempt from replacement according to a specified cache replacement algorithm in response to a subsequent attempt to store an object within said server cache if insufficient space exists within said server cache; and casting out any object within said server cache according to said specified cache replacement algorithm in response to a subsequent attempt to store an object within said server cache if insufficient space exists within said server cache and all stored objects therein are temporarily exempt from replacement.

12. The method for enhanced cache efficiency according to claim 11, wherein said step of specifying selected stored objects within said server cache as temporarily exempt from replacement based upon a preselected criterion comprises the step of specifying selected stored objects within said server cache as temporarily exempt from replacement based upon a size of each of selected stored objects.

13. The method for enhanced cache efficiency according to claim 12, wherein the step of specifying selected stored objects within said server cache as temporarily exempt from replacement based upon a size of each of said selected objects comprises the step of specifying any object which is less than 100 kilobytes in sizes temporarily exempt from replacement.

14. The method for enhanced cache efficiency according to claim 11, wherein said step of specifying selected stored objects within said server cache as temporarily exempt from replacement based upon a preselected criterion comprises the step of specifying selected stored objects within said server cache as temporarily exempt from replacement based upon a quality of service lever mandated for a client which requested said selected object.

15. A computer program product for use within a processor having a cache memory associated therewith, said computer program product residing on a computer usable medium having computer readable program code therein, said computer program product comprises:

cache control instruction means for specifying selected objects within a cache as temporarily exempt from replacement based upon a preselected criterion;

first instruction means for casting out an object which is not designated as temporarily exempt from replacement according to a specified cache replacement algorithm in response to a subsequent attempt to store an object within said cache if insufficient space exist within said cache; and second instruction means for casting out any object within said cache according to said specified cache replacement algorithm in response to a subsequent attempt to store an object in said cache if insufficient space exist within said cache and stored objects therein are temporarily exempt from replacement.

* * * * *